United States Patent Office 3,121,794
Patented Feb. 18, 1964

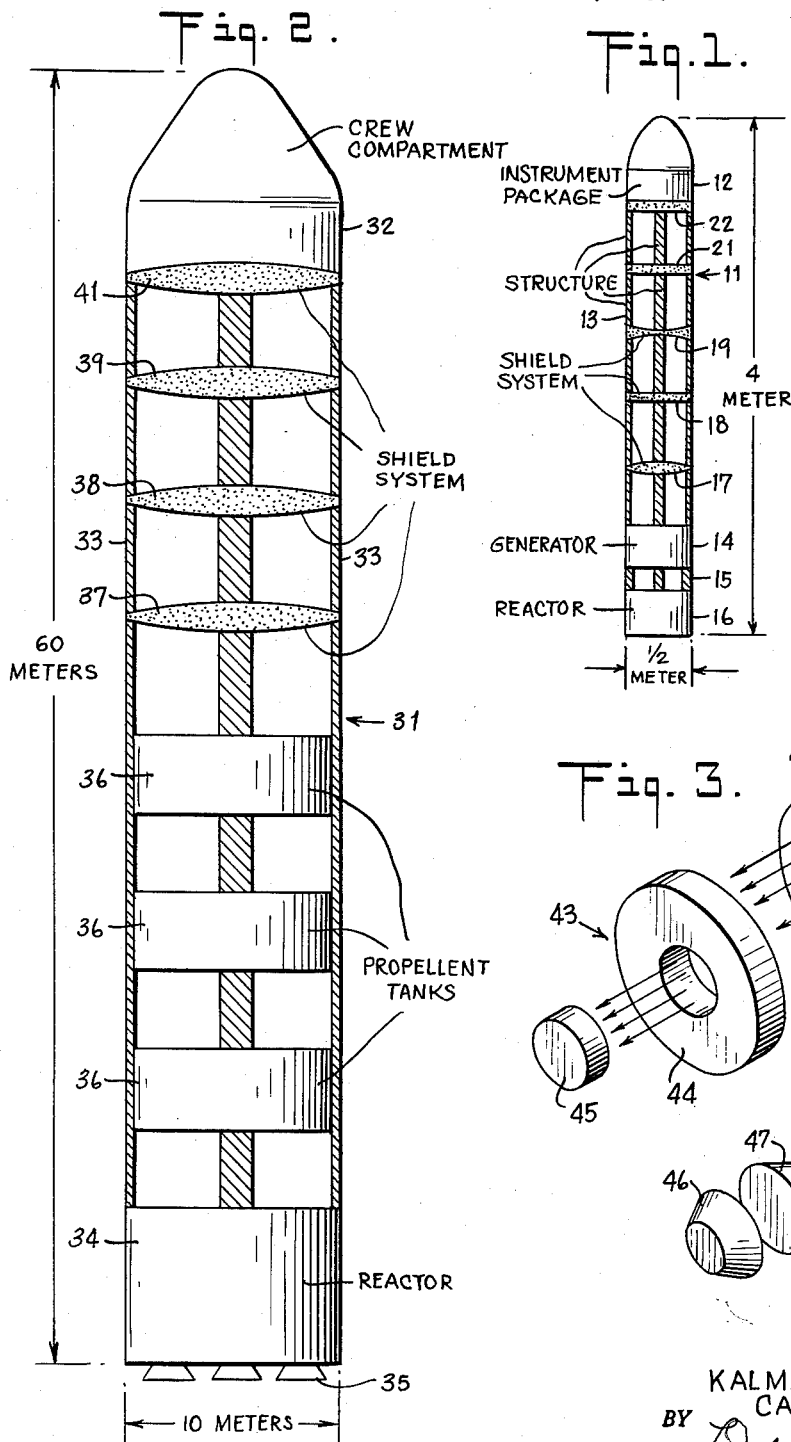

3,121,794
SCATTERING RADIATION SHIELD
Kalman M. Held, 35 Hedgerow Lane, Jericho, N.Y., and Carl N. Klahr, Brooklyn, N.Y., assignors, by mesne assignments, to Kalman M. Held, Jericho, N.Y.
Filed Oct. 12, 1959, Ser. No. 845,786
10 Claims. (Cl. 250—108)

The present invention relates to radiation shielding and more particularly to such shielding for shielding a first volume comprising a personnel or instrument package or the like from radiation comprising gamma rays, neutrons or other similar radiation emanating from a second volume.

A particular application to which the present invention is especially adapted in the shielding of a crew compartment or instrument package in a manned or unmanned space vehicle from a nuclear reactor which is used for propulsion or auxiliary power for the vehicle.

Although the present shielding means is particularly adapted to use in space where there is substantially no matter in the immediate vicinity of the apparatus which might scatter radiation back to the protected volume, it will be understood that the invention is not limited to such application.

Previous practices in the shielding of nuclear reactors in vehicles such as airplanes have utilized principally the mechanism of radiation absorption for the protection of a crew compartment or instrument package.

Two methods of utilizing absorption for radiation protection have been practiced. First a wrap-around shield has been utilized consisting of hydrogenous (or other low atomic weight) materials and heavy materials such as lead or tungsten. The former are used chiefly to attenuate neutrons while the latter are used to absorb and attenuate gamma rays. The materials are wrapped around either or both the reactor and the compartment to be shielded, preferably in a spherical shape. Secondly, shadow shields have been utilized consisting of a large block of shielding material (or layers of shielding materials) interposed on a direct line between the radiation source and the object to be shielded. The two types of shields, namely the wrap-around and the shadow type may be combined in certain mobile reactors, such as proposed for nuclear propelled airplanes for example.

It will be noted that these previous shielding practices rely preponderantly on absorption of the radiation, and although scattering of radiation takes place, there is substantially no net advantage gained by reason of scattering alone. The negligible effect played by scattering in the usual radiation shield may be demonstrated by the fact that multiply-scattered radiation (technically called "buildup") represents the preponderant portion of the dose encountered at the object to be shielded due to the fact that the shield configuration allows multiply-scattered radiation to reach the shielded compartment substantially without discrimination.

In contrast, the present invention relates to a shield design that utilizes scattering as the predominant means of eliminating radiation from a protected compartment. Some absorption will necessarily take place in such a shield and obviously an absorptive shield can be used in conjunction with the present invention as a secondary means of elimination of radiation. Because this "scattering shield" eliminates the scattered part of the radiation to a large extent, the large "buildup" which predominates in the ordinary shielded compartment is substantially eliminated and the direction beam of unscattered radiation contributes most materially to the dosage in the protected compartment. The present invention provides the possibility of eliminating by a factor of 15 to 50% the shielding required for a given dose reduction and thus will be seen to be of great importance, particularly in nuclear propulsion applications wherein it is anticipated that half or more of the weight of the apparatus would comprise shielding based on previous shielding techniques.

A portion of the savings made possible by the present invention is due to the geometry of the scattering shield. In one embodiment a series of relatively thin disks will be placed between the source and the shielded compartment with each disk spaced from adjacent disks as far as practicable. Although the shield elements are spoken of as disks, it will be understood that they may take other forms such as lens-shapes or other distinctive shapes to maximize the probability of scattering into space and to adapt a shield to particular applications.

Another advantage and distinction of the present invention resides in the type of material utilized in the shielding. For the present invention the scattering cross section per unit weight of the material is of prime importance while the absorption cross section is of relatively lesser importance. Generally the best material for shielding devices according to the present invention are light elements such as hydrogen, hydrogenous compounds or other light elements or their compounds rather than heavy elements. This is in distinct contrast to previous shielding arrangements where heavy elements were desirable.

The use of heavy elements in previous shields was dictated by the desire to place the shielding mass as close to the source of radiation or to the compartment to be protected as possible. The desirability of close placement will be appreciated when it is understood that the amount of absorptive shielding for a given degree of shielding increases approximately as the square of the distance of the shielding material from the source or protected compartment. Due to the straight line geometry characteristic of the present invention, no disadvantage accrues from the distributed spacing of the shielding material and hence the use of light elements is not precluded.

In addition to the reduction of shielding weight previously explained the present invention provides a decrease in heat generation within the shield thus greatly reducing or eliminating the requirement for shield cooling. It should further be noted the problem of secondary particle production within the shield is substantially reduced since secondary particle production results from absorption of radiation and not from scattering.

A further advantage accrues from the fact that the shielding material does not have to be concentrated around the radiation source or the protected compartment and thus the shielding readily may serve a dual purpose such as vehicle structure or propulsion material compartments.

It is accordingly an object of the present invention in addition to the objects and advantages described above to provide radiation shielding which requires the addition of a lesser weight of material than previously known forms of shielding.

It is a further object of the invention to provide a radiation shield which operates to place primary reliance upon the phenomenon of scattering rather than that of absorption for preventing radiation from reaching a protected volume.

It is still a further object of the present invention to provide radiation shielding which utilizes a distributed scattering barrier between a radiation source and a volume to be protected, so that radiation which would normally reach the protected volume is exposed to a high probability of being scattered thereby giving a large portion of such radiation a direction of propagation which does not intercept the protected volume.

Further objects and advantages will be apparent from a consideration of the appended drawings in which, FIGURE 1 is a partially schematic cross sectional view of a satellite having auxiliary nuclear power and incorporating a shielding according to the present invention;

FIGURE 2 is a partially schematic cross sectional view of a nuclear powered rocket incorporating shielding constructed according to the present invention;

FIGURE 3 is a partially schematic perspective view of an alternative form of scattering barrier which may be incorporated in a shielding system according to the present invention; and FIGURE 4 is a partially schematical view of a still further alternative form of scattering barrier which may be incorporated into a shielding system according to the present invention.

Referring first to FIGURE 1 a satellite structure 11 is shown such as might be utilized for a television relay station. The satellite 11 has an instrument package 12. The instrument package 12 will contain the instruments of the satellite such as a television relay receiver and transmitter for example.

The instrument package 12 is connected by structural members 13 to an electrical generator compartment 14. The electrical generator compartment 14 is substantially spaced from the instrument package for reasons which will later be apparent. The electrical generator in the compartment 14 may be a turbo generator for converting heat power into electricity or may be an all electronic heat-electricity transducer or any other suitable form of electrical generator.

The electrical generator in compartment 14 is supplied with power in the form of heat by a nuclear reactor 16 which is secured at the left end of the satellite as seen in FIGURE 1 by means of structural members 15.

It will be understood that these structural members 15 may incorporate fluid conduits or other means for the transfer of heat from the reactor 16 to the electrical generator in compartment 14. It will be further understood that the satellite structure 11 is selected as a particular type of device to which shielding according to the present invention may be applied and that shielding according to the present invention may in fact be utilized in many different situations in which radiation shielding is desired and particularly where one of two volumes separated in space is desired to be protected from radiation from the other.

In FIGURE 1 a radiation shield is shown comprising shielding elements 17, 18, 19, 21 and 22. Shielding element 17 is shown to be formed in the shape of a convex lens; elements 18 and 21 are of disk shape while element 19 shaped in the form of a concave lens. It will be understood that the shapes of the elements in FIGURE 1 is given primarily to illustrate the different forms in which the shielding elements may be constructed and that enumerable forms and combinations of forms can be constructed without departing from the invention.

The material of which the shielding elements 17–21 is formed is chosen so that the elements will be effective in scattering radiation but not necessarily so that they will be good absorbers. In the case of shielding element 22 immediately adjacent the instrument package, it may be desirable to form this element of a good radiation absorber rather than a good radiation scatterer and thus element 22 may preferably be formed somewhat in accordance with prior practice.

As previously explained, the shielding elements 17–21 are preferably formed of light metal materials of low atomic weight rather than of the heavy materials often used in previous radiation shielding. For example the elements 17–21 may be formed of liquid hydrogen (in a suitable container of course), high temperature hydrides (e.g., zirconium hydrides), of beryllium or beryllium oxide. Other scattering materials may of course be selected for the shielding elements 17–21. It is preferred, however, that the scattering material have a scattering cross section without a sharply peaked forward lobe; it is obviously desirable that the velocity vector of the scattered radiation have a substantial transverse component with respect to its original direction.

The shielding elements 17–21 may be utilized for other purposes in addition to their shielding function. For example shielding elements may be utilized for a radiator to dissipate low temperature heat not utilizable by the electrical generator in compartment 14. The possibility of double utility for the shielding elements is a definite advantage over previous shielding systems wherein it was usually necessary to place the shielding material as close as possible to either the instrument package or the radiation source. This fact and the fact that the shielding material was required to be of high density in order that it could be placed in a small volume close to the instrument package or the radiation source made it generally impractical to use shielding for a secondary purpose.

It should further be noted that in FIGURE 1 the electrical generator compartment 14 is spaced from the nuclear reactor 16 so that it also acts effectively as a scatterer. Of course the material of which the electrical generator is formed will be largely dictated by its primary function but the material selected will perform some scattering and it may therefore be worthwhile to utilize the electrical generator compartment as a scattering element by spacing it from the nuclear reactor 16.

The following greatly simplified analysis will show the remarkable effectiveness of properly controlled scattering as by the multiple shielding elements 17–21 in FIGURE 1. An important parameter is the ratio of the disk radius to the separation distance between disks. This ratio will be called $\alpha$.

$$\alpha = \frac{\text{radius of disk}}{\text{separation distance between disks}}$$

To demonstrate the effectiveness of multiple-scattering the escape probability into space as a function of $\alpha$ for two such disks has been calculated.

$P(\alpha)$ = escape probability into space for given $\alpha$. Assuming a point source and point receiver and isotropic scattering within the disks. Then $P(\alpha)$ is the probability that a neutron or gamma scattered in the first disk escapes into space and does not strike the second disk. This probability is zero for the two disks contiguous. The following expression for $P(\alpha)$ has been derived $$P(\alpha) = \sqrt{\frac{1}{\alpha^2} + \frac{1}{4\alpha^4} - \frac{1}{2\alpha^2}}$$

A tabulation of $P(\alpha)$ is given:

| $\alpha$ | $P(\alpha)$ |
| --- | --- |
| 0.0 | 1 |
| 0.2 | 0.96 |
| 0.5 | 0.83 |
| 0.7 | 0.73 |
| 1.0 | 0.62 |
| 1.4 | 0.50 |
| 2.0 | 0.39 |
| 3.0 | 0.28 |
| 5.0 | 0.18 |

Thus even for a radius-to-spacing ratio of 2 to 1, one still loses approximately 39% of the scattered radiation by the splitting. Thus if one considers that part of the build-up which suffers 10 collisions, it would be attenuated by a factor of $[1-P(\alpha)]^{10}$, if there is tenfold (or more) splitting.

It will be understood that the above analysis of a greatly simplified case of the multiple scattering shield of FIGURE 1 is presented only as an explanation which, recognizing its limitations, is believed valid, but is not intended to limit the scope of the invention, which is much broader than this special case.

It will be appreciated that the foregoing analysis is a greatly simplified one, but it serves to show the advantages of even a less than optimum arrangement of scattering material.

The advantages and operation of the shielding system of FIGURE 1 can also be understood from a less mathematical and more intuitive approach. Consider the radiation which has passed through the electrical generator compartment 14 and which has a direction of propagation which if unchanged would cause it to pass into the instrument package 12, this radiation has a probability of 1.0 of striking each of the shields 17, 18, 19 and 21 (it will be considered for the time being that shield 22 is a conventional absorptive shield, rather than a scattering shield element).

However, some of the radiation previously described will not pass through shield element 17 with its direction of propagation unchanged, but will experience a collision and a resulting change in direction. It is obvious that such collided radiation has a probability of less than 1.0 of striking shield elements 18, 19 and 21 and instrument package 12. If the collided radiation passes laterally from the shielding assembly without striking the next shield element 18 it clearly will not strike the instrument package 12 and thus the total received radiation will be attenuated to this extent (it is assumed that any effect of the structural elements 13 is negligible as is the effect of any atmosphere or surrounding matter).

If the collided radiation is deflected by collisions so that it would not strike the instrument package if it continued its new direction but is not sufficiently deflected so that it will miss the succeeding shielding element 18 then the calculation of its probability of eventually reaching the instrument package is somewhat more complicated but its probability is clearly less than one.

In any event it will be seen that each scattering element produces some attenuation of the radiation which ultimately reaches the instrument package and that the percentage of such radiation decreases exponentially with the number of scattering elements. Obviously for a given number of scattering elements the attenuation increases with the total length of the assembly of elements and thus increases with the distance between elements. From the foregoing explanation it may be seen that the structure provided causes a higher probability of collision for radiation having a direction of propagation along a line which would intercept the protected volume as compared with the probability of collision (average) for radiation in a transverse direction within the shielding structure.

Referring now to FIGURE 2, a nuclear powered rocket 31 is shown schematically. Such a rocket is an application in which shielding according to the present invention may be particularly advantageously applied. It will be noted that in such a rocket there is a source of radiation and the crew compartment is a volume which must be protected from the radiation source. A crew compartment is shown at 32 and a nuclear reactor is shown at 34 substantially spaced from the crew compartment and connected by structural members 33.

The nuclear rocket vehicle 31 is shown as having a plurality of rocket engine nozzles 35. It will be appreciated, however, that it is immaterial whether the rocket uses a thermal propulsion system, an ionic propulsion system or any other form of propulsion system which involves the creation of radiation.

Propellant tanks 36 are shown which are split into sections spaced so that they also form shields according to the present invention. The primary purpose of the propellent carried in the tanks 36 is not for fuel, as that is effectively supplied by the nuclear reactor, but the operation of a rocket vehicle depends upon the ejection of material from the rocket at high velocity and the propellent tanks 36 will contain such material. Normally, material of low atomic (or molecular) weight is desired for use as the propellant and it will therefore be seen that it is likely that the propellant material will also be well adapted as a scattering shield (notably in the case of hydrogen).

In addition to the propellant tanks 36, additional scattering shields 37, 38 and 39 are arranged between the nuclear reactor 34 and the crew compartment 32 so that any radiation from the former to the latter must pass through the shields 37–39. As before, a shield 41 is provided immediately adjacent the crew compartment which may be preferred to be an absorptive shield due to its close proximity to the compartment 32.

The scattering shields 37, 38 and 39 are shown to be of lens shape, but as will be more fully explained, these shields may take numerous shapes which will in part be determined by the relative sizes and the shapes of the nuclear reactor and the compartment to be shielded, the distance that they may be separated and other factors. The material for the shields 37, 38 and 39 may be any of the materials previously discussed with respect to FIGURE 1.

Although a relatively small number of shields is shown in each of the FIGURES 1 and 2, it will be understood that in practice a much larger number of shields may be desired. The desirability for a larger number of shields in some instances will be appreciated from the fact that once a gamma or neutron has collided in a particular shield, further collisions to the same gamma or neutron will generally be of no further advantage and may even be disadvantageous. Therefore, once a shield is made thick enough so that a substantial portion of the radiation particles experience at least one collision, further increasing the thickness of the transverse shield may prove to be of diminishing effectiveness, and it is likely that the total shielding provided by increase in thickness would be less than that provided by increasing the number of transverse shields.

Referring now to FIGURE 3, an alternative shield configuration is shown which may be substituted for the various transverse shield configurations shown in FIGURES 1 and 2.

A radiation source is shown at 42 and a shield element 43 is shown comprising a toroidal portion 44 and a cylindrical portion 45. A number of shield elements 43 may be placed between the radiation source 42 and the volume to be protected. The volume to be protected is omitted for simplicity in FIGURE 3, but it will be understood that it is on the opposite side of shield element 43 from the radiation source 42. Shield elements 43 may also be combined with other forms of shield elements shown in FIGURES 1 and 2.

FIGURE 4 shows a further alternative form of shield element comprising a tapered disk 46. This element may be placed in a set with a further tapered disk 47, facing in the opposite direction.

It should be understood that only a few of the innumerable forms of shielding elements have been illustrated. For example, the principle utilized in the shielding element of FIGURE 3 may be extended so that the shield comprises a plurality of toroids of graduated diameter terminating in a cylindrical element 45, with each outer diameter of a smaller toroid overlapping the inner diameter of the adjacent larger toroid to prevent direct passage of radiation from source to protected volume without passage through at least one portion of the shield element.

A still further extension of the principle of FIGURE 3 results in a single hollow conical shield element having its axis parallel to a line joining the center of the radiation source with the center of the protected volume and having its base near or adjacent the radiation source with its apex near or adjacent the protected volume. Such a configuration provides a high probability of collision for radiation directed from the source toward the protected volume as compared with the likelihood of collision for radiation having a substantial transverse component of velocity.

The conical form of shield could also be arranged with the apex of the cone near the radiation source and the base of the cone near the volume to be protected, or two cones could be provided, one arranged in this fashion and one arranged in the previously described opposite fashion.

Theoretically, the number of transverse shields in shielding systems such as in FIGURES 1 and 2 could be continually increased with a proportionate decrease in their thickness until the volume between the source and the volume to be protected was effectively filled uniformly with a scattering medium of effectively low density; it is thought, however, that such an arrangement might be undesirable from a practical point of view. Although all explanations have been in terms of devices of circular cross section; where the radiation source or the protected volume is of other cross section the shield may be altered accordingly.

From the foregoing explanation it will be appreciated that the form of the shield structure may be of various types and it will generally be desired that the shield structure length in the direction of the propagation of radiation from the reactor to the protected volume shall be at least four times the effective radius of the cross section of the shielding structure, and that the shielding material is distributed, but not necessarily continuously distributed, along the direction of propagation and is also distributed across the cross section of the shield to prevent radiation from passing through the shield without encountering at least a portion of the shielding structure. The material forming the shielding structure is preferably one having a strong scattering effect but not necessarily a strong absorptive effect in proportion to its weight.

From the foregoing explanation it will be understood that shielding structure has been described which is particularly effective through the use of the phenomenon of radiation scattering, and which provides a high degree of protection in proportion to its weight. Many modifications and variations of the forms of the invention described and suggested may be made by a person of skill in the art, and it is accordingly desired that the scope of the invention not be limited to the particular embodiments shown or suggested and that the scope of the invention be limited solely by the appended claims.

What is claimed is:

1. A shield for protecting a predetermined volume in a substantially non-radiation-scattering environment from penetrating radiation from a radiation source spaced from said volume comprising an assembly of at least one body of material having substantial radiation scattering properties, said material being distributed over a distance measured parallel to a line joining the center of said source and the center of said volume substantially greater than the average cross-sectional dimension of said assembly measured in a plane perpendicular to said line, the material of said assembly being distributed transverse to a line joining the center of said volume and the center of said source so that substantially every line joining said volume and said source intercepts a substantial volume of said material and substantially every portion of said material may be intercepted by a line joining said volume and said source, whereby the average probability of scattering collision for radiation from said source within said assembly having a direction of propagation, the projection of which intercepts said volume, is large and substantially greater than the average probability of scattering collision for other radiation from said source within said assembly.

2. A shield for protecting a predetermined volume in a substantially non-radiation-scattering environment from penetrating radiation from a radiation source spaced from, but in proximity to, said volume comprising an assembly of at least one body of material having strong radiation scattering properties relative to its weight, said material being distributed over a distance measured parallel to a line joining the center of said source and the center of said volume not less than approximately twice the average cross-sectional dimension of said assembly measured in a plane perpendicular to said line, the maximum effective transverse dimension of said assembly being not less than approximately that of the smaller of said volume or radiation source, the material of said assembly being distributed transverse to a line joining the center of said volume and the center of said source so that substantially every line joining said volume and said source intercepts a substantial volume of said material and substantially every portion of said material may be intercepted by a line joining said volume and said source, whereby the average probability of scattering collision for radiation from said source within said assembly having a direction of propagation, the projection of which intercepts said volume, is large and substantially greater than the average probability of scattering collision for other radiation from said source within said assembly.

3. A shield for protecting a predetermined volume in a substantially non-radiation-scattering environment from penetrating radiation from a radiation source spaced from, but in proximity to, said volume comprising an assembly of at least one body of material having strong radiation scattering properties relative to its weight, said material being distributed substantially continuously over a distance measured parallel to a line joining the center of said source and the center of said volume not less than approximately twice the average cross-sectional dimension of said assembly measured in a plane perpendicular to said line, the maximum effective transverse dimension of said assembly in any given direction being not less than approximately that of the smaller of said volume or radiation source, the material of said assembly being distributed transverse to a line joining the center of said volume and the center of said source so that substantially every line joining said volume and said source intercepts a substantial volume of said material and substantially every portion of said material may be intercepted by a line joining said volume and said source, whereby the average probability of scattering collision for radiation from said source within said assembly having a direction of propagation, the projection of which intercepts said volume, is large and substantially greater than the average probability of scattering collision for other radiation from said source within said assembly.

4. A shield for protecting a predetermined volume in a substantially non-radiation-scattering environment from penetrating radiation from a radiation source spaced from, but in proximity to, said volume comprising an assembly of at least one body of material having strong radiation scattering properties relative to its weight, said material being distributed discontinuously over a distance measured parallel to a line joining the center of said source and the center of said volume not less than approximately twice the average cross-sectional dimension of said assembly measured in a plane perpendicular to said line, the maximum effective transverse dimension of said assembly in any given direction being not less than approximately that of the smaller of said volume or radiation source, the material of said assembly being distributed transverse to a line joining the center of said volume and the center of said source so that substantially every line joining said volume and said source intercepts a substantial volume of said material and substantially every portion of said material may be intercepted by a line joining said volume and said source, whereby the average probability of scattering collision for radiation from said source within said assembly having a direction of propagation, the projection of which intercepts said volume, is large and substantially greater than the average probability of scattering collision for other radiation from said source within said assembly.

5. Apparatus as claimed in claim 4 wherein said at least one body of material comprises a plurality of transverse scattering barriers having an average thickness in a direction parallel to a line joining the center of said source and the center of said volume which is small compared with their average transverse dimension.

6. Apparatus as claimed in claim 4 wherein said at least one body of material comprises at least one toroidal scattering member and a scattering member disposed to intercept radiation directed from said source to said volume which passes through the opening in said toroidal scattering member.

7. A radiation shielded compartment protected while in a substantially non-radiation-scattering environment from penetrating radiation from a radiation source spaced from, but in proximity to, said compartment comprising a compartment enclosure and an assembly of at least one body of material having strong radiation scattering properties relative to its weight, said material being distributed over a distance measured parallel to a line joining the center of said source and the center of said compartment not less than approximately twice the average cross-sectional dimension of said assembly measured in a plane perpendicular to said line, the maximum effective transverse dimension of said assembly being not less than approximately that of the smaller of said compartment or radiation source and not greater than approximately that of the greater thereof, the material of said assembly bein distributed transverse to a line joining the center of said compartment and the center of said source so that substantially every line joining said volume and said source intercepts a substantial volume of said material whereby the average probability of scattering collision for radiation within said assembly on a collision course with said compartment from said source is large and substantially greater than the average probability of scattering collision for radiation within said assembly and not on a collision course with said compartment.

8. Apparatus as claimed in claim 7 wherein said at least one body of material comprises a plurality of radiation scattering barriers having an average thickness in a direction parallel to a line joining the center of said source and the center of said compartment which is small compared to their average transverse dimension.

9. Apparatus as claimed in claim 7 wherein said at least one body of material comprises at least one toroidally cross-sectioned portion and a second portion disposed to intercept radiation directed from said source to said compartment which passes through the opening in said toroidally cross-sectioned portion member.

10. A shield for protecting a predetermined volume in a substantially non-radiation-scattering environment from penetrating radiation from a radiation source spaced from said volume and having a predetermined direction of propagation comprising an assembly of at least one body of material having substantial radiation scattering properties, said material being distributed over a distance measured parallel to said direction of propagation substantially greater than the average cross-sectional dimension of said volume measured in a plane perpendicular to said direction of propagation, the material of said assembly being distributed transverse to said direction of propagation so that substantially every line extending in said direction of propagation and intercepting said volume intercepts a substantial thickness of said material and substantially every portion of said material may be intercepted by such a line, whereby the average probability of scattering collision for radiation within said assembly having a direction of propagation, the projection of which intercepts said volume, is large and substantially greater than the average probability of scattering collision for other radiation.

References Cited in the file of this patent

UNITED STATES PATENTS

| | | |
|---|---|---|
| 2,773,459 | Sechy | Dec. 11, 1956 |
| 2,796,529 | Morrison | June 18, 1957 |
| 2,842,678 | Silverman | July 8, 1958 |
| 2,884,536 | Swift | Apr. 28, 1959 |
| 2,964,631 | Foster | Dec. 13, 1960 |

OTHER REFERENCES

Radiation Shielding, by Price, B. T., et al., chapter 3, pp. 99 to 157, published by Pergamon Press, New York, N.Y., 1957.